Oct. 1, 1929.   S. W. AVIS   1,729,977
SCREW EYE AFFIXING MACHINE
Filed March 22, 1924   8 Sheets-Sheet 1
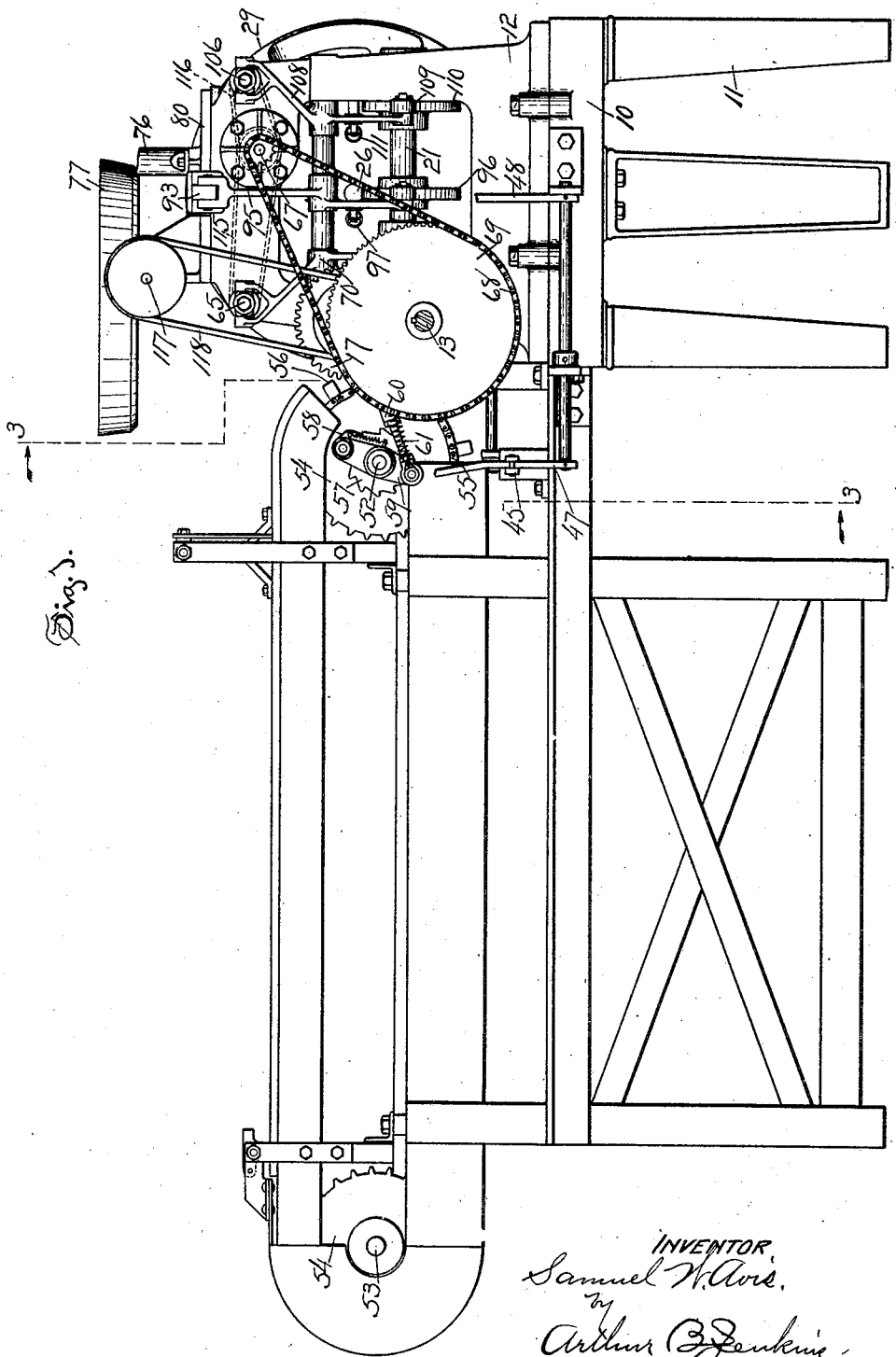

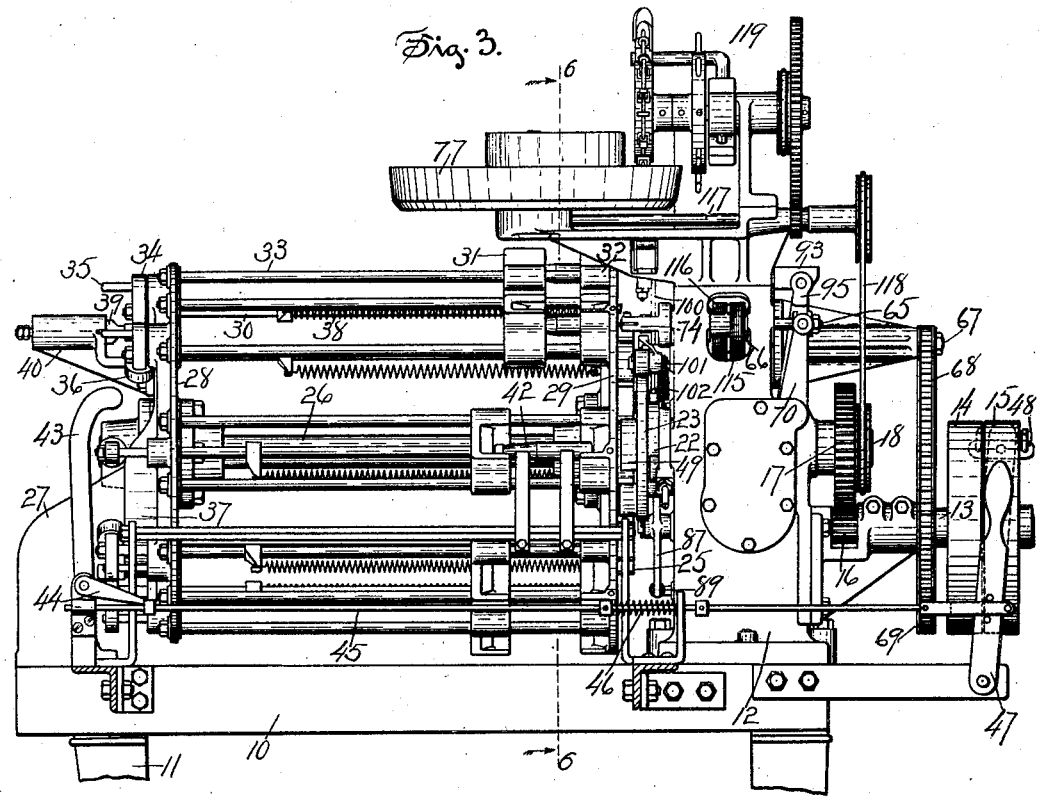

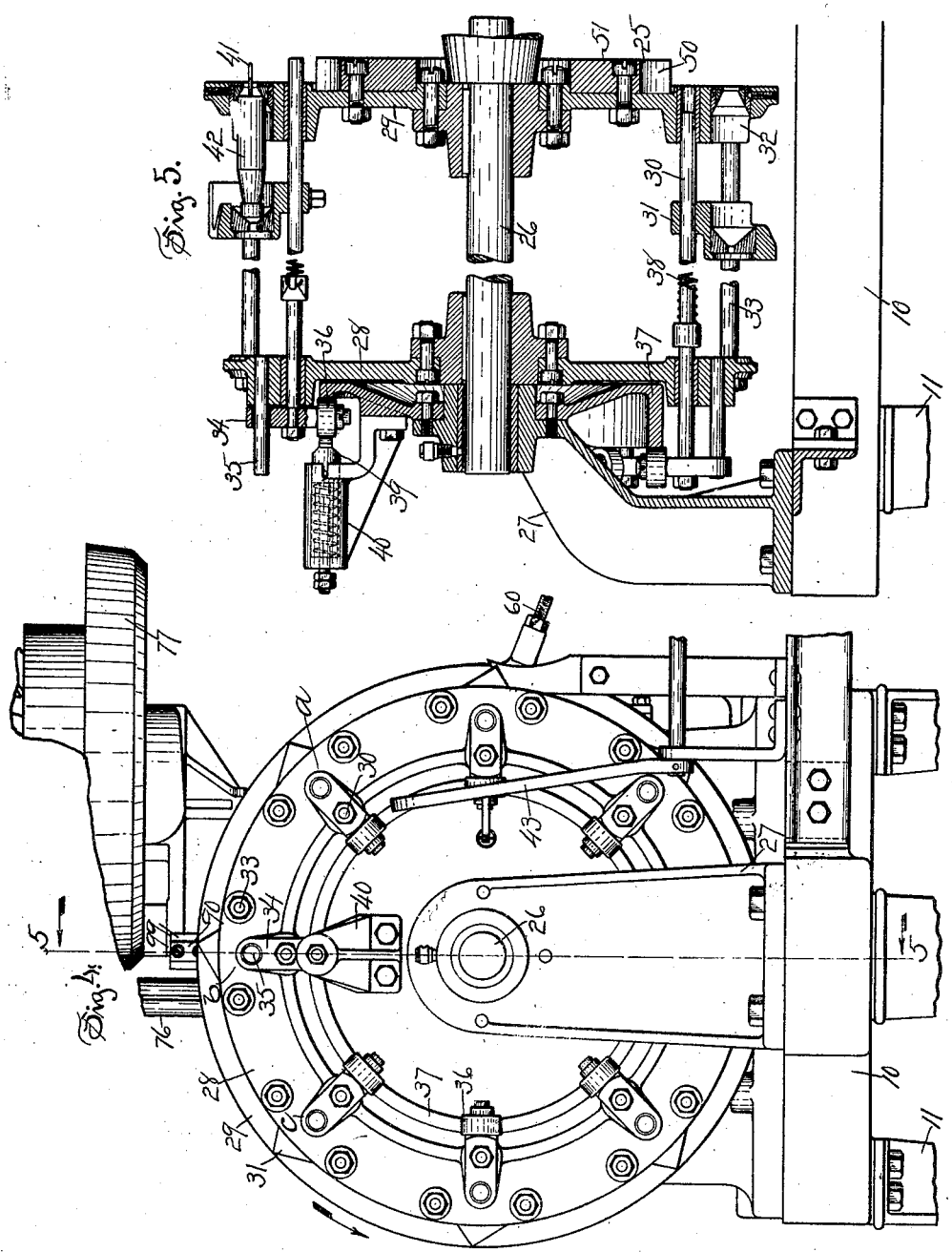

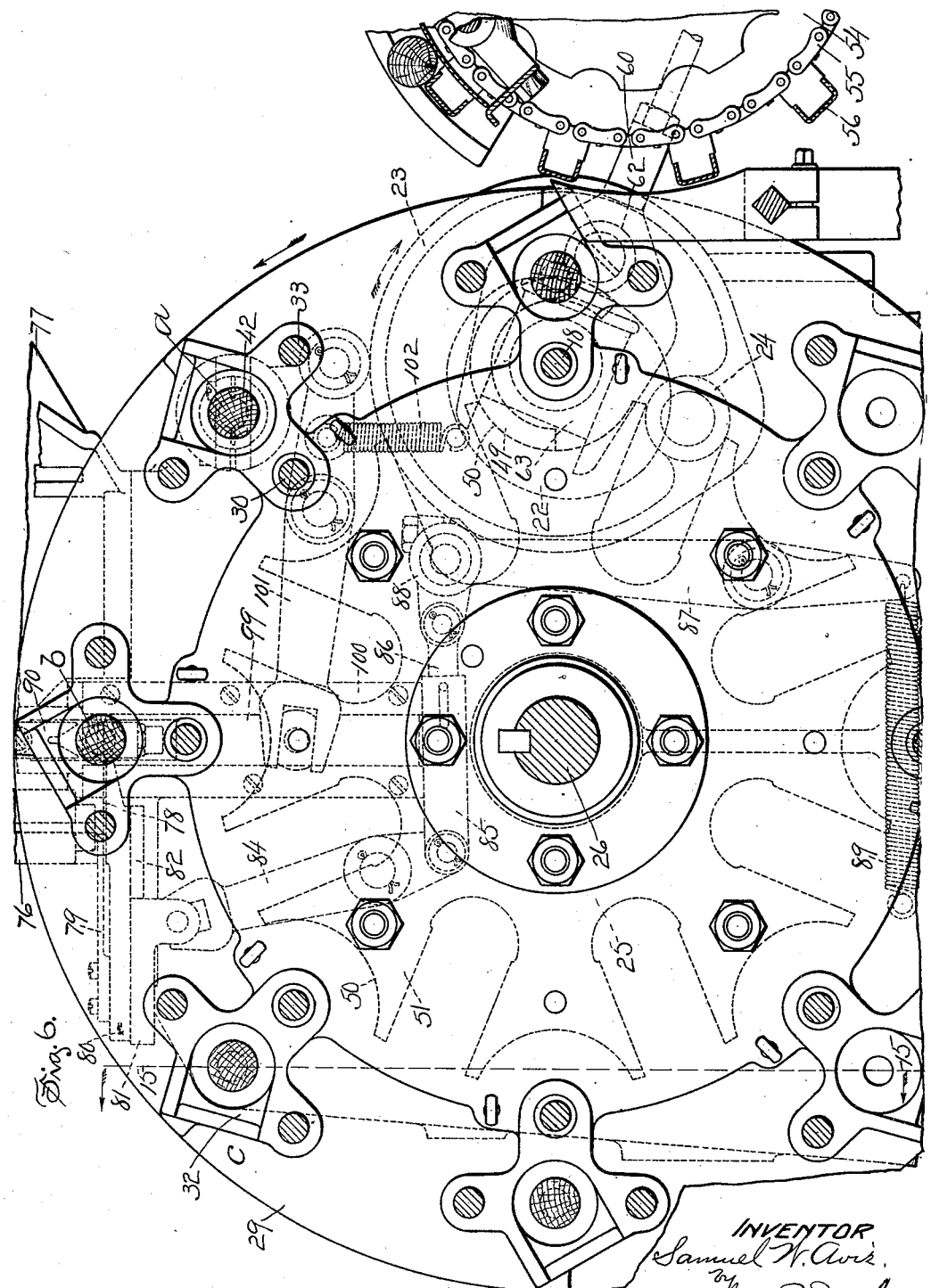

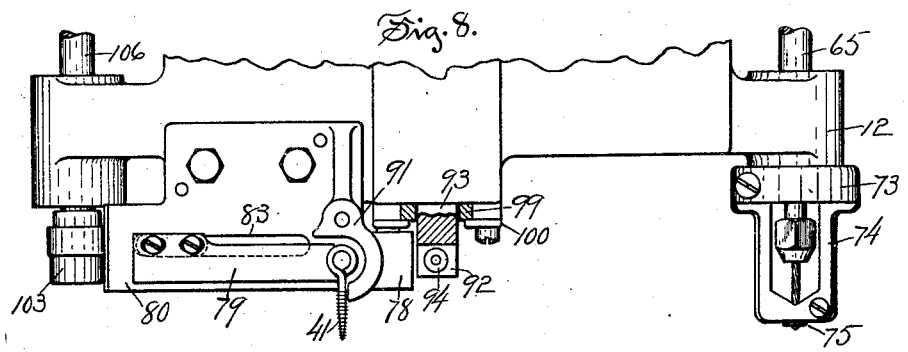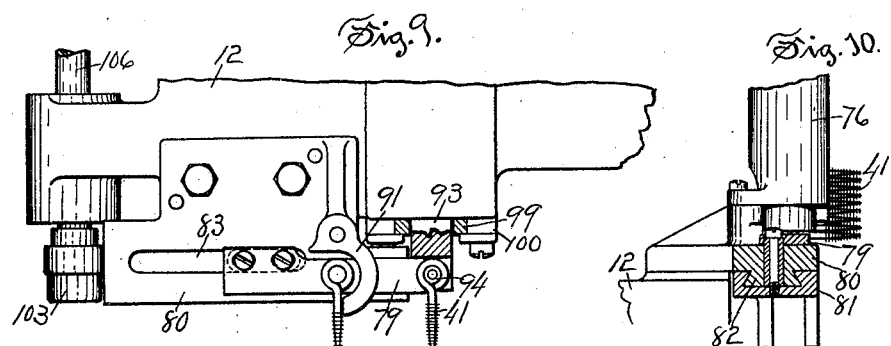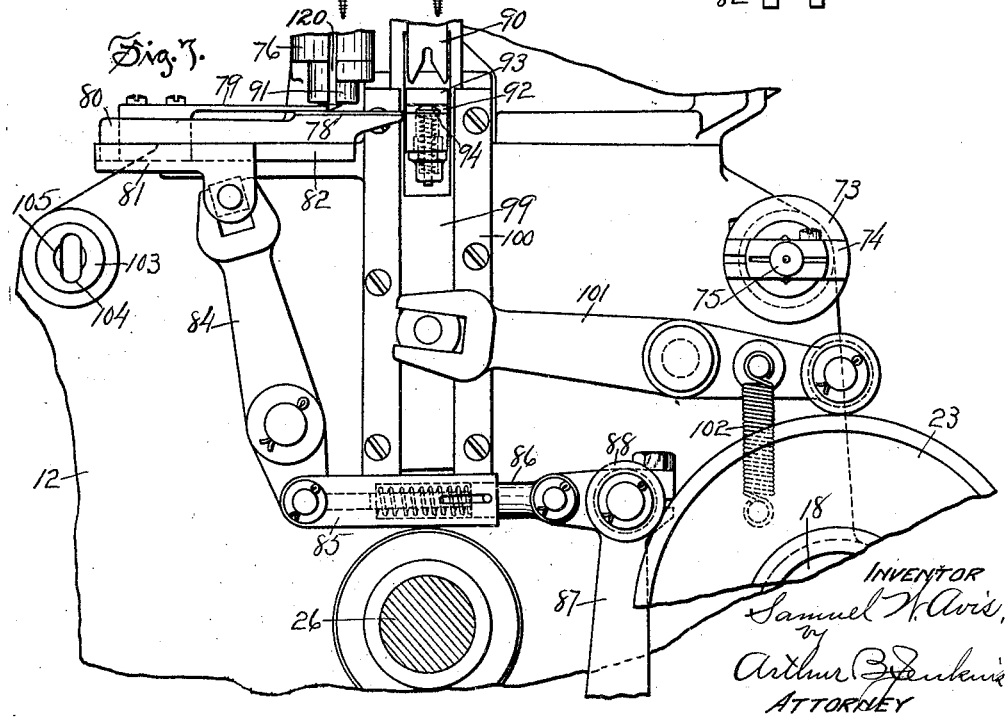

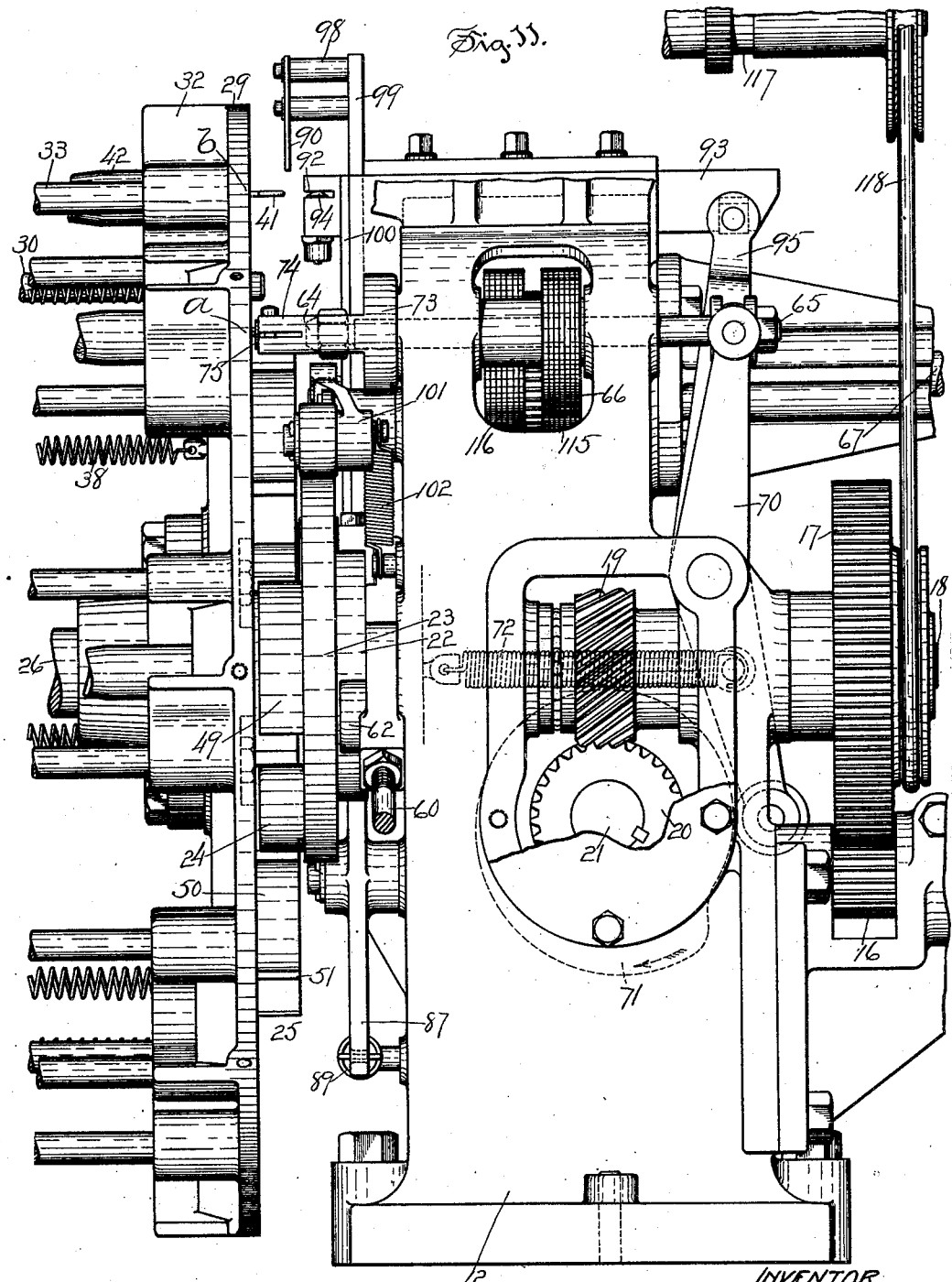

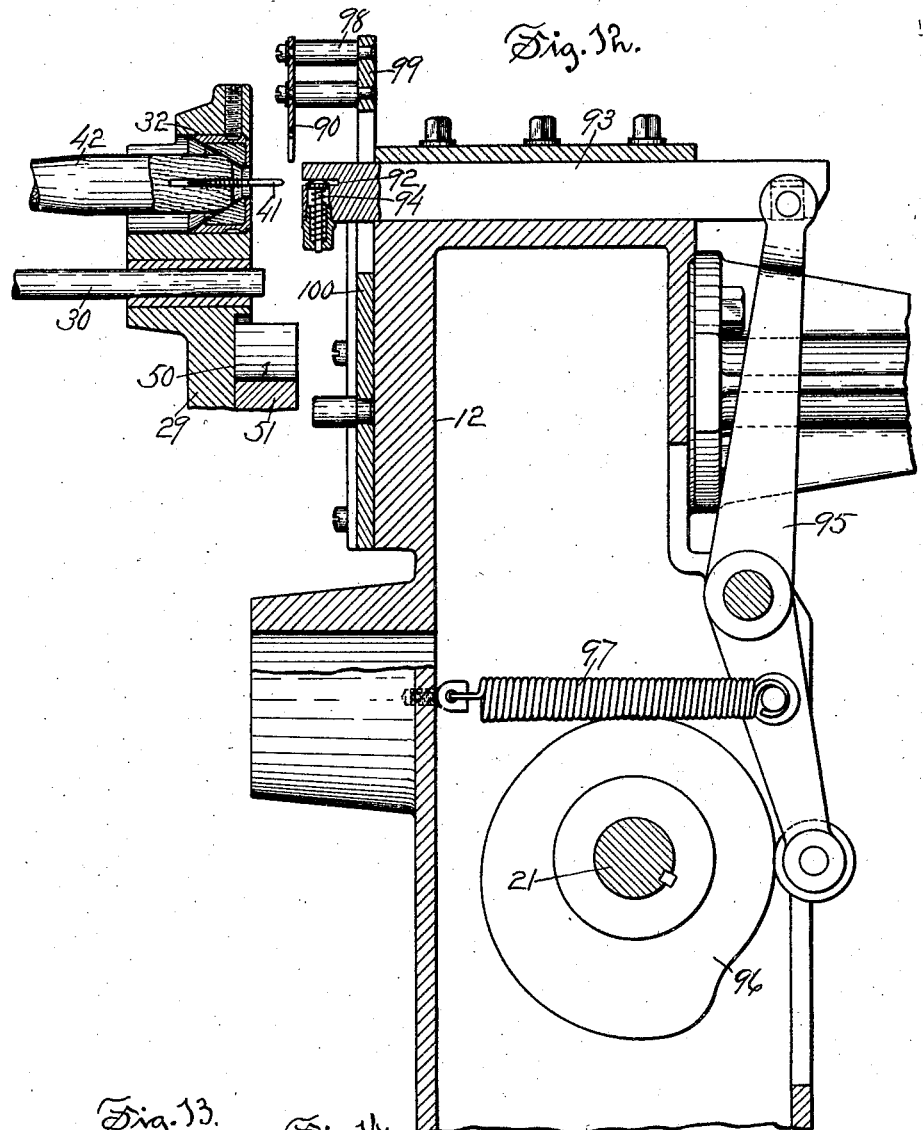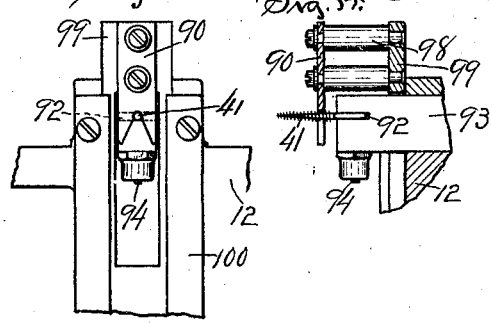

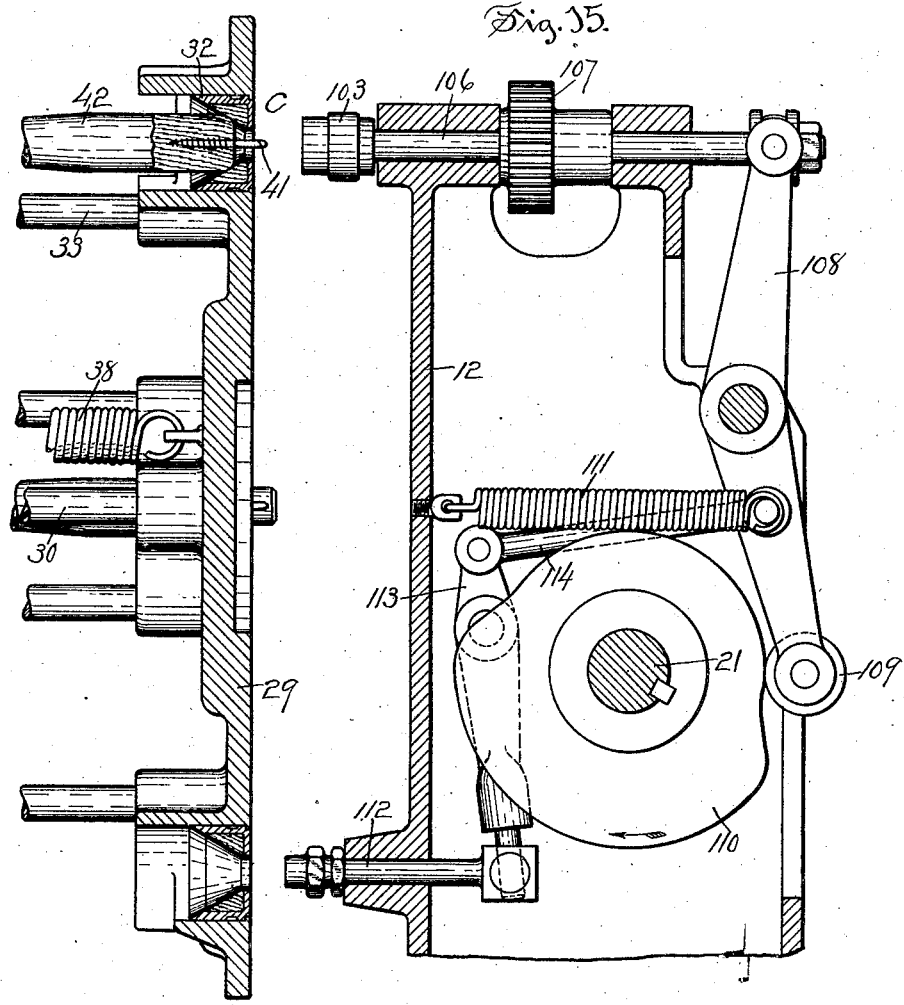

Patented Oct. 1, 1929

1,729,977

UNITED STATES PATENT OFFICE

SAMUEL W. AVIS, OF WEST HARTFORD, CONNECTICUT, ASSIGNOR TO THE FULLER BRUSH COMPANY, OF HARTFORD, CONNECTICUT, A CORPORATION OF CONNECTICUT

SCREW-EYE AFFIXING MACHINE

Application filed March 22, 1924. Serial No. 701,235.

This invention relates to the class of machines for affixing screw eyes, as in the ends of the handles used for various purposes, and an object of my invention, among others, is the production of a machine that shall be particularly rapid and efficient in the performance of work required of it.

One form of machine embodying the invention and in the construction and use of which the objects herein set out, as well as others, may be attained, is illustrated in the accompanying drawings, in which—

Figure 1 is a view in side elevation of a machine embodying the invention, with the driving shaft broken off and with the hopper feed mechanism shown elsewhere removed.

Figure 2 is a top view of the machine with said hopper feed mechanism and the magazine removed and with parts underneath omitted, the hopper, however, being shown. The pusher is shown in its advanced position as in Figure 9.

Figure 3 is a view in end elevation on a plane denoted by the dotted line 3—3 of Figure 1.

Figure 4 is a view, scale enlarged, in elevation of a portion of said machine looking at the side opposite to that shown in Figure 1.

Figure 5 is a view on a plane denoted by the dotted line 5—5 of Figure 4, with the center broken out.

Figure 6 is a view, scale still further enlarged, on a plane denoted by the dotted line 6—6 of Figure 3, the hopper being broken off and part of the conveyor mechanism removed.

Figure 7 is a detail view illustrating the construction and operation of the screw eye feeding mechanism.

Figure 8 is a detail top view of part of the mechanism shown in Figure 7, the magazine, however, being removed and parts being broken away to show construction.

Figure 9 is a similar view but with the screw eye pusher shown in its advanced position.

Figure 10 is a view in cross section through the mechanism shown in Figure 9 and illustrating the manner of mounting the screw eye pushing mechanism.

Figure 11 is a detail view of a portion of the mechanism shown at the right hand side of Figure 3, the scale being enlarged, and parts being broken away to clearly show the construction.

Figure 12 is a detail sectional view illustrating the construction and operation of the screw eye adjusting and inserting mechanism.

Figures 13 and 14 are fragmentary details further illustrating the construction and operation of the adjusting and inserting mechanism.

Figure 15 is a detail sectional view illustrating the construction and operation of the screw eye driver.

In the accompanying drawings the numeral 10 indicates the bed of this improved machine that may be supported as upon legs 11, and a frame 12 is mounted upon the bed to support the operative parts of the machine. A driving shaft 13 is mounted in the frame and is driven as by means of pulleys 14—15 in any ordinary manner. This shaft has a pinion 16 meshing with a gear 17 on an intermediate shaft 18, the latter having a worm 19 meshing with a worm wheel 20 on a cam shaft 21. A conveyor driving cam 22 is secured to the shaft 18 and the driving member 23 of a Geneva movement is also secured to said shaft and supports a roller 24 that is adapted to enter the slots in the star wheel 25 of the Geneva movement in a manner common to such movements, and as will be readily understood.

The star wheel 25 is secured to a carrier having a shaft 26 that is supported at one end in the frame 12 and at its opposite end in a bracket 27 rising from the bed 10. The carrier comprises end discs 28—29 secured to the shaft 26 and having a series of actuating rods 30, each slidably mounted in the discs and supporting a movable clamp member 31 positioned opposite a cooperating clamp member 32, said cooperating clamp members being carried by the end disc adjacent to the frame 12. The clamp members 31 are also mounted upon guide rods 33, there being preferably two guide rods to each of the clamp members, and as shown in Figure 6 of the drawings. The guide rods also act as tie rods to connect the end discs 28 and 29.

A clamp actuating arm 34 is secured to the end of each actuating rod 30 and is in engagement with a guide rod 35, as shown in Figure 5 of the drawings. Each arm 34 bears a roller 36 that travels, as the carrier is rotated in a manner to be hereinafter described, in contact with a clamp actuating cam 37 secured to the bracket 27, said cam being shaped to impart endwise movement to each rod 30 at the proper time to release a handle from the grasp of the clamp members 31—32 after such handle has been secured between the clamp members by the action of a clamp spring 38 secured at one end to each of the rods 30 and at its opposite end to the end disc 29, as shown in Figures 2, 3, 5 and 11 of the drawings.

A holder 39 in the form of a plunger is mounted upon a spring in a case on a bracket 40 projecting from the bracket 27, and as shown in Figure 5 of the drawings, this holder being in contact with the rollers 36 at the time a screw-eye 41 is being forced into a handle 42 and in a manner to be hereinafter described, the holder thus providing for a resilient support for the movable member of the clamp during the insertion of the screw-eye, the spring in the bracket 40 being enough stronger than the springs 38 to resist the thrust of the screw-eye under ordinary conditions, but to yield under the force of the screw-eye should abnormal conditions arise.

It will thus be seen that the movable clamp members 31 being adjustably secured to the actuating rods 30, such clamp members may be positioned to receive handles of such different lengths as may be desired.

A stop lever 43 pivotally mounted on the bracket 27 has its free end located in the path of movement of the rollers 36 when the latter are located in position to close the clamps, and therefore should conditions prevent clamping operation of the clamps by the springs 38 to secure a handle or other device, the rollers striking the end of said lever will rock it on its pivot and thereby release a locking detent 44 from engagement with a stop shoulder on a belt shifting rod 45 and thereby permit said rod to be moved by a belt shifting spring 46 to actuate a pivotally mounted belt shifting handle 47 connected with a belt shifter 48 to shift the driving belt from the fast to the loose pulley and as shown in Figure 3 of the drawings, and thus stop the operation of the machine.

The carrier is given a step-by-step movement by the action of the roller 24 in passing into and out of the recesses in the star wheel of the Geneva movement, in a manner that will be readily understood, and the carrier is held from rotation when said wheel is disengaged from said recesses by a lock 49 comprising a segment on the side of the driving member 23 of the Geneva movement, said lock entering grooved locking recesses 50 in the outer ends of arms 51 of the wheel 25, and as shown in dotted lines in Figure 6 of the drawings.

The handles or other devices 42 are delivered to the carrier by means of a conveyor comprising, briefly described, two shafts 52—53, each supporting at its opposite ends sprocket wheels 54 around which pass two endless chains 55 that are connected by bars 56 spaced apart a suitable distance to receive the handles between them, said handles, in the machine herein shown, being placed upon the conveyor by hand. The conveyor has a step-by-step movement imparted to it by a ratchet and pawl mechanism comprising a ratchet wheel 57 secured to the shaft 52 and engaged by a spring pressed pawl 58 pivotally mounted on a rocker arm 59 supported on said shaft. The end of this arm opposite the ratchet is connected by a conveyor operating rod 60 with the cam 22 to impart timely step-by-step movement to the conveyor. This cam imparts active movement to said rod and a spring 61 imparts an idle movement thereto. The operating rod 60 is forked at its end opposite the arm 59 to straddle and be supported by the shaft 18 and as shown in Figures 6 and 11 of the drawings, said arm having a roller 62 in contact with the cam 22, and as shown in said figures. The forked end of the rod has a bearing on a block 63 mounted on the shaft 18, said block thereby taking the wear incident to the reciprocating movement of the rod.

The handles 42 are received between the clamping jaws during a dwell in the step-by-step movement of the carrier, and in the next movement of the carrier the handles are positioned at the point indicated by a in Figure 6 of the drawings, in which position a hole is made in the end of the handle by a drill secured in a chuck 64 mounted in a drill spindle 65 having a longitudinal reciprocating movement in the frame 12. A sprocket wheel 66 is splined to the spindle and is driven by a chain 115 passing around said wheel and around a sprocket on a spindle driving shaft 67 mounted in the frame of the machine and driven as by a sprocket chain 68 passing around a sprocket on said shaft and a sprocket 69 secured to the main driving shaft 13, and as shown in Figure 1 of the drawings. Longitudinal reciprocating movement is given to the drill spindle by means of a drill spindle actuating lever 70 pivotally mounted in the machine with its upper end suitably engaged with the drill spindle to impart such longitudinal movement and at the same time to permit rotation of said spindle, the lower end of said lever being positioned for operation by a drill spindle actuating cam 71 secured to the cam shaft 21, and as shown in dotted outlines in Figure 11 of the drawings. A spring 72 imparts idle movement to said lever and said cam imparts active movement thereto. A drill support is secured to the frame 12, as shown in Figs. 8 and 11 of the drawings, this support comprising a base 73 secured to the frame and having arms 74 united at their outer ends and having a bushing 75 through which the drill is adapted to be moved, said bushing being located in proximity to the side of the end disc 29 of the carrier, and as shown in Figure 11 of the drawings.

After the hole is drilled as above described in the next one step movement of the carrier the handle is moved to the next position indicated by the letter $b$ in Figures 6 and 11 of the drawings, in which position a screw-eye 41 is inserted in the mouth of the hole formed by the drill. These screw-eyes are presented for insertion in the mouth of the drilled hole by positioning and adjusting mechanism. These screw-eyes may be supplied to the positioning mechanism by any suitable means, as herein shown such screw-eyes being deposited in the upper end of a magazine 76 and to the lower end of which they pass by gravity. This deposit of the screw-eyes within the magazine may, if desired, comprise feed mechanism including a hopper 77, a detailed description of which is omitted herein.

A receiving plate 78 is located underneath the magazine 76, the lower screw-eye in the pile of screw-eyes contained within the magazine resting upon said plate. A pusher 79 is supported for reciprocating movement on a shelf 80 secured to the frame 12, and as shown in Figures 8 and 9 of the drawings, said shelf on its upper surface receiving the plate 78. A pusher slide 81 is supported for sliding movement on a dove-tailed projection 82 on the under side of the shelf 80, the pusher being secured to the slide as by means of bolts passing through a slot 83 in said shelf and in said projection. A pusher operating lever 84 is pivotally mounted on the frame 12 and is operatively connected at one end with the pusher slide and at its opposite end with a pusher actuating rod comprising two sections 85—86, the latter telescoping within the former and having a pin projecting into a slot in the section 85 and a spring within a recess in said section 85 tending to force the two sections apart, and as illustrated in Figure 7 of the drawings. The section 86 is pivotally atached to a lateral projection from a spring actuated lever 87 pivotally mounted on the frame 12 and having a roller 88 supported on a stud projecting from its side. A spring 89 secured to the lower end of the lever 87 holds it with the roller 88 in contact with a pusher actuator cam formed on the periphery of the driving member 23 of the Geneva movement, said cam imparting active movement to the pusher and the spring imparting idle or backward movement to said pusher.

This cam on the member 23 is suitably formed to impart timely movement to the pusher to remove the bottom screw-eye from the pile in the magazine 76 and push it into position underneath an adjuster 90, the spring forming part of the connection between the two sections of the pusher actuating rod being sufficiently stiff to cause such movement, but yielding sufficiently to prevent such movement should any obstruction, as in the form of an imperfect screw-eye or otherwise, oppose free movement of the pusher. The screw-eyes in their movement from the pile in the magazine pass under a magazine support 91 on the shelf 80 and as shown in Figures 8 and 9 of the drawings, the magazine being secured at its lower end to said support.

From the magazine the screw-eyes are delivered by the pusher into a mouth 92 on the end of an inserting bar 93 slidably mounted in the frame 12, and as shown in Figure 12 of the drawings. A holder 94 is yieldingly mounted in the lower jaw of the mouth 92 and is adapted to yield under the force imparted to the screw-eye by the pusher 79, in the structure shown the holder being seated upon a spring, as shown in said Figure 12. The upper end of the holder is rounded for reception within the opening in the screw-eye, said holder yielding as the screw-eye is forced into the mouth to permit said screw-eye to be placed, and then the holder springing upwardly into the opening in the eye to yieldingly retain it in place.

An inserting lever 95 is pivotally mounted on the frame of the machine and is operatively connected at one end with the bar 93 and at its other end bears a roller in contact with an inserting cam 96 secured to the cam shaft 21, and as shown in Figure 12 of the drawings. A spring 97 holds the roller on the lever in contact with the cam 96 and, therefore, imparts idle or rearward movement to the bar 93, said cam imparting active movement to said bar to push a screw-eye held in the mouth 92 into the previously drilled opening in the handle 42, as shown in Figure 12, this insertion being simply sufficient to hold the eye in place and permit yielding of the holder 94 for disengagement from said eye.

The adjuster 90 comprises a plate having a V-shaped notch in its lower end, said plate being supported upon posts 98 projecting from the upper end of an adjuster slide 99 mounted for reciprocating movement in an adjuster slide support 100 secured to the frame 12, and as shown in Figure 12 of the drawings. An adjuster slide operating lever 101 is pivotally mounted on said frame and is connected at one end with the slide 99 and at its opposite end bears a roller in contact with the cam on the periphery of the driving member 23 of the Geneva movement. A spring 102 attached at one end to the lever 101 and at its opposite end to the frame of the machine is employed to hold the roller in contact with its cam and thus impart idle or reverse movement to the slide 99, said cam imparting active movement to said slide, as shown in Figure 6 of the drawings.

In the operation of this device a screw-eye being inserted by the pusher 79 within the mouth 92 is engaged by the adjuster 90 in its downward movement and is thereby positioned in line with the drilled hole in the end of the handle 42 so that when the inserting bar 93 is moved forward the pointed end of the screw-eye will enter such hole, the bar 93 extending through a slot in the adjuster slide 99, and as shown in Figure 12 of the drawings.

From the station $b$ after the screw-eye has been inserted as just described, the carrier is given another one-step movement and the handle is located at the station $c$ and during the dwell of the carrier at this point the screw-eye is screwed into the handle by the mechanism shown in Figure 15 of the drawing. This mechanism comprises a driver 103 suitably shaped to engage the end of the screw-eye 41 and screw it to place. A slot 104 is formed in the end of the driver, as shown in Figure 7 of the drawings, and this slot is relieved on opposite sides as at 105 for a purpose to be presently described. The driver is secured to a driver spindle 106 mounted in the frame 12 and having a sprocket wheel 107 splined to the spindle. A driver operating lever 108 is pivotally mounted in the frame and is engaged at one end with the spindle 106 to impart longitudinal movement thereto, but to permit rotation thereof, the opposite end of the lever having a roller 109 in contact with a driver cam 110 secured to the cam shaft 21. A spring 111 imparts idle movement to the driver spindle and the cam imparts active movement thereto.

The cam is shaped to impart timely movement to the spindle 106 to engage it with the screw-eye and screw the latter into the handle 42, and in order to prevent undue force being applied to the screw-eye and a consequent stripping of the thread in the handle the relief 105 plays a part, as when the screw-eye is seated any abnormal force will cause the handle 42 to be pushed backwardly, the actuating rod 30 bearing the movable clamp being permitted to yield against the spring 38 that holds the clamp in clamped position, and under such abnormal conditions the driver 103 will be permitted to rotate owing to the relief 105 in its end. The driver spindle 106 is rotatably driven as by means of a sprocket chain 116 passing around the sprocket on the shaft 67 as hereinbefore described.

The hopper feed mechanism, incompletely illustrated herein, comprises, generally speaking, an agitating shaft 117 driven as by means of a belt 118 from the shaft 18, said mechanism also comprising a collecting mechanism 119 driven from the shaft 117. This mechanism, however, forms no part of the invention comprised in the present application and for this reason a further description is omitted herein.

An ejector 112 is mounted for reciprocating movement in the frame 12, as shown in Figure 15 and is pivotally connected to one end of a pivotally mounted ejector lever 113, the opposite end of said lever being connected by an ejector rod 114 with the driver operating lever 108. The cam 37 is formed and timed to release the movable clamp members after the screw-eyes have been affixed, and should for any reason the handles remain between the clamps after such release, the ejector will operate to certainly remove the handles.

A screw eye receiving rod 120 is loosely mounted in the magazine 76, its upper end (not herein shown) being adapted to receive screw eyes that travel downwardly by gravitation along said rod. The lower end of the rod has a beveled end that causes the rod to be lifted under pressure of a screw eye caused by the pusher 79 to remove said eye from under the magazine.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:—

1. A screw eye affixing machine including a carrier movable to different stations, means for delivering articles to the carrier at one of said stations, means for making holes in said articles at another of said stations, means for supplying screw eyes in position to be placed in said holes at another of said stations, and means for screwing said eyes into said holes at still another of said stations.

2. A screw eye affixing machine including a carrier movable to different stations, means for delivering articles to the carrier at one of said stations, means for making holes in said articles at another of said stations, means for supplying screw eyes in position to be placed in said holes, means for placing screw eyes in said holes at another of said stations, and means for screwing said eyes into said holes at still another of said stations.

3. A screw eye affixing machine including a carrier movable to different stations, means for delivering articles to the carrier at one of said stations, means for supplying screw eyes in a location to be affixed to the articles at another of said stations, means movably mounted for adjusting the position of the points of the screw eyes with respect to holes in said articles in said location, and means for securing the screw-eyes in said articles at still another of said stations.

4. A screw eye affixing machine including a member to receive articles to which screw eyes are to be affixed, clamps having recesses to receive the ends of articles and open on one side to admit said articles laterally and closed on the opposite side to retain said articles, said clamps each including a member movably mounted, means for operating the movably mounted clamp member, and means for affixing screw eyes to articles held by said clamps.

5. A screw eye affixing machine including a movably mounted carrier, clamps mounted on said carrier, each of said clamps including a movable member and each of said clamps having recesses open on one side to receive said articles and closed on the opposite side to retain said articles, means for projecting articles through said openings into said recesses in one position of the carrier, means for thereafter closing the clamps, and means for affixing screw eyes to said articles in another position of the carrier.

6. A screw eye affixing machine including a movably mounted carrier, clamps mounted on said carrier, each of said clamps including a movably mounted member and each of said clamps having recesses open on one side to receive said articles and closed on the opposite side to retain said articles, means for projecting articles through said openings into said recesses in one position of the carrier, means for thereafter closing the clamps, means for affixing screw eyes to said articles while held by said clamps, and means for opening the clamps after the screw eyes have been affixed.

7. A screw eye affixing machine including a movably mounted carrier, clamps mounted on said carrier, each of said clamps including a movably mounted member and each of said clamps having recesses open on one side to receive said articles and closed on the opposite side to retain said articles, means for projecting articles through said openings into said recesses in one position of the carrier, means for thereafter closing the clamps, means for affixing screw eyes in articles held by said clamps, means for holding the clamps during the affixing of said screw eyes, and means for thereafter opening the clamps for discharge of said articles.

8. A screw eye affixing machine including a movably mounted carrier, clamps mounted on said carrier to receive articles to which screw eyes are to be affixed, means for actuating said clamps, and a stop motion member positioned in the path of movement of said clamp actuating members when the clamps are in their opened position and adapted to be struck and thereby stopping the machine if the clamps are in their open position when arriving opposite said stop motion member.

9. A screw eye affixing machine including a movably mounted carrier, clamps mounted on said carrier, each of said clamps having recesses with upwardly opening mouths and closed on the opposite side of said mouths to retain said articles, means for projecting articles to which screw eyes are to be affixed into said mouths, means for operating the clamps to clamp said articles while the mouths are thus opened upwardly, means for affixing screw eyes to said articles, and means for opening said clamps for removal of said articles when said mouths are opened downwardly.

10. A screw eye affixing machine including a movably mounted carrier to receive articles to which screw eyes are to be affixed, means for operating said carrier, an inserting bar having a mouth comprising jaws having means to yieldingly receive and hold screw eyes, means for forcing screw eyes to the grip of the jaws of said mouth, and means for operating said bar to move said mouth to cause said screws to be forced between the jaws thereof and to present said eyes to said articles.

11. A screw eye affixing machine including a movably mounted carrier to receive articles to which screw eyes are to be affixed, means for operating said carrier, an inserting bar having a mouth comprising jaws, means for yieldingly holding screw eyes in said jaws, means for forcing screw eyes into the grip of the jaws of said mouth, and means for operating the bar to present said eyes to said articles.

12. A screw eye affixing machine including a movably mounted carrier to receive articles to which screw eyes are to be affixed, an inserting bar having means to receive and hold screw eyes and to move them and to present them to said article, means for supplying screw eyes to said bar, means for adjusting the position of screw eyes in said bar, and means for operating the bar to present the screw eyes to said articles.

13. A screw eye affixing machine including a movably mounted carrier to receive articles to which screw eyes are to be affixed, means for mechanically operating said carrier, an inserting bar having means to yieldingly retain screw eyes, means for mechanically placing screw eyes in the path of movement of said bar, means for adjusting the position of screw eyes in said bar, and means for mechanically operating the bar to present screw eyes to said articles.

14. A screw eye affixing machine including a movably mounted carrier to receive articles to which screw eyes are to be affixed, an inserting bar having a mouth, a holder yieldingly positioned in said mouth, means for placing screw eyes in the path of movement of said bar, and means for operating said bar.

15. A screw eye affixing machine including a movably mounted carrier to receive articles to which screw eyes are to be affixed, an inserting bar having a mouth to receive and hold said screw eyes means for placing screw eyes in said mouth, means for aligning screw eyes in said mouth, and means for operating said bar.

16. A screw eye affixing machine including an inserting bar having means to receive and hold a screw eye, means for reciprocating said bar, an aligning device movable laterally of said inserting bar to align screw eyes therein, means for operating said aligning device and means for inserting said eye in said article.

17. A screw eye affixing machine including an inserting bar having means to receive a screw eye, means for imparting longitudinal reciprocating movement to said bar, an adjuster slide having an opening through which said bar extends, means located on said slide for aligning screw eyes in said bar, and means for operating said slide.

18. A screw eye affixing machine including a bar having a mouth to receive screw eyes, means for imparting reciprocating movement to said bar, a pusher having a reciprocating movement to push screw eyes into said mouth, and means for delivering screw eyes in the path of movement of said pusher.

19. A screw eye affixing machine including a pusher having a longitudinally reciprocating movement, a magazine located above the pusher to deliver screw eyes in the path of movement thereof, an inserting bar having a mouth located in the path of movement of screw eyes advanced by said pusher, and means for operating said inserting bar.

20. A screw eye affixing machine including a pusher having a longitudinally reciprocating movement, a magazine located above said pusher to deliver screw eyes into its path and projecting laterally thereof, an inserting bar movable laterally of said pusher and having a mouth in the path of screw eyes advanced by said pusher, and an aligner movable laterally to said pusher and to said inserting bar to align screw eyes in said mouth.

21. A screw eye affixing machine including a magazine having a slot in one wall to receive the shanks of screw eyes, a receiving plate underlying said magazine to receive screw eyes thereon, a guard located above said plate and spaced therefrom to permit movement of a single screw eye only thereunder, means for moving screw eyes underneath said guard, and means for receiving said screw eyes for other manipulation thereof.

22. A screw eye affixing machine including a receiving plate, a magazine support spaced above said receiving plate for passage of screw eyes underneath said support, a magazine mounted on said support and having an open lower end for delivery of screw eyes onto said plate, and a pusher for moving the screw eyes underneath said support to devices for further manipulating said screw eyes.

23. A screw eye affixing machine including means to receive an article to which a screw eye is to be affixed, means for forming a hole in said article, means for manipulating a screw eye to present it to said article, said manipulating and receiving means being relatively movable, and said manipulating means including means for placing a screw eye in said hole in one position of said article, and means for screwing said eye into the article in another position of the latter.

24. A screw eye affixing machine including means to receive an article to which a screw eye is to be affixed, means for manipulating a screw eye to present it to said article, said manipulating means including means to receive and hold and to convey a screw eye to said article, means for adjusting the position of a screw eye therein, means for operating said receiving means to attach said eye to said articles, said manipulating and receiving means being relatively movable and means for securing said eye into said article.

25. A screw eye affixing machine including means to receive an article to which a screw eye is to be affixed, means for manipulating said screw eye, said manipulating means including means to receive a screw eye and to hold and convey it to said article in one position of the latter and said manipulating and receiving means being relatively movable, means for adjusting the position of a screw eye within said holder, means for operating said receiving means, and means for securing the screw eye to said article in another position of said article.

26. A screw eye affixing machine including a movably mounted carrier to receive articles to which screw eyes are to be affixed, an inserting bar having a mouth with a yielding jaw to receive and hold screw eyes, means for forcing screw eyes into the grasp of said jaws, means for placing screw eyes in the path of movement of said forcing means for delivery to said jaws, and means for operating said bar to present screw eyes to said articles.

27. A screw eye affixing machine including a movably mounted carrier to receive articles to which screw eyes are to be affixed, an inserting bar having a mouth with a yielding jaw to receive and hold screw eyes, means for forcing screw eyes into the grasp of said jaws, means for placing screw eyes in the path of movement of said forcing means for delivery to said jaws, means for operating said bar to present screw eyes to said articles, and means for securing said eyes in said articles.

28. A screw eye affixing machine including a member to receive articles to which screw eyes are to be affixed, a clamp mounted on said member and having an article receiving socket in its end with an opening through the side thereof, said clamp being movable to change the location of said open side with respect to a vertical position, a carrier positioned to receive said articles from said clamp when said open side opens downwardly, means for operating said member, and means for operating the carrier.

29. A screw eye affixing machine including a carrier movable to different stations, means for delivering articles to the carrier at one of said stations, means for stopping said machine if an article leaves the last mentioned station improperly positioned in the carrier, means for making holes in said articles at another of said stations, means for supplying screw eyes in position to be placed in said holes at another of said stations, and means for screwing said eyes into said holes at still another of said stations.

30. A screw eye affixing machine including a carrier movable to different stations, means for delivering articles to the carrier at one of said stations, means for stopping said machine if an article leaves the last mentioned station improperly positioned in the carrier, means for making holes in said articles at another of said stations, means for supplying screw eyes in position to be placed in said holes, means for placing screw eyes in said holes at another of said stations and means for screwing said eyes into said holes at still another of said stations.

31. A screw eye affixing machine including a movably mounted carrier, means for moving said carrier, means on said carrier having opening and closing movement for holding articles to which screw eyes are to be affixed during a portion only of the cyclic movement of the carrier, and means for rendering the first mentioned means inoperative should one of the holding means remain open after receiving an article.

32. A screw eye affixing machine including inserting means to receive and yieldably hold a screw eye, means for reciprocating said inserting means, an aligning device movable laterally of said inserting means to align screw eyes therein, and means for inserting said eyes in said articles.

33. A screw eye affixing machine including inserting means to receive and yieldably hold a screw eye, means for reciprocating said inserting means, an adjuster slide having an opening through which said inserting means extends, means located on said slide for aligning screw eyes in said inserting means, and means for operating said slide.

34. A screw eye affixing machine including a member to receive articles to which screw eyes are to be affixed, means for clamping articles to said member, means for affixing screw eyes to said articles including an eye rotating member, means for releasing said clamping means to discharge finished articles, and means directly connected to the eye rotating member to operate simultaneously therewith for forcibly expelling finished articles should they remain in the clamping means after the latter is opened.

35. A screw eye affixing machine including a member to receive articles to which screw eyes are to be affixed, means for clamping articles to said member, means for affixing screw eyes to said articles including a reciprocating and rotating eye screwing member, means for releasing said clamping means to discharge finished articles, and a reciprocating plunger directly connected to the eye screwing member to operate simultaneously therewith for forcibly expelling finished articles should they remain in the clamping means after the latter is opened.

SAMUEL W. AVIS.